United States Patent
Eckart

(10) Patent No.: US 8,117,841 B2
(45) Date of Patent: Feb. 21, 2012

(54) SELF REGULATING WASTE GATE

(75) Inventor: Aaron Eckart, Redcliffe (CA)

(73) Assignee: Eckart Industrial Corporation, Redcliff (CA)

( * ) Notice: Subject to any disclaimer, the term of this patent is extended or adjusted under 35 U.S.C. 154(b) by 397 days.

(21) Appl. No.: 12/505,028

(22) Filed: Jul. 17, 2009

(65) Prior Publication Data

US 2011/0011083 A1    Jan. 20, 2011

(51) Int. Cl.
F02D 23/00 (2006.01)
F01B 19/00 (2006.01)
F16J 3/00 (2006.01)

(52) U.S. Cl. ............. 60/602; 92/94; 92/96; 92/102
(58) Field of Classification Search ............. 60/602; 92/94, 96, 102
See application file for complete search history.

(56) References Cited

U.S. PATENT DOCUMENTS

| | | | | |
|---|---|---|---|---|
| 3,848,517 A | * | 11/1974 | Hawke | 92/101 |
| 3,941,035 A | * | 3/1976 | Mueller | 92/49 |
| 4,171,936 A | * | 10/1979 | Hageman et al. | 417/407 |
| 4,256,019 A | * | 3/1981 | Braddick | 92/94 |
| 4,292,887 A | * | 10/1981 | Ohta et al. | 92/94 |
| 4,377,070 A | * | 3/1983 | Shadbourne | 60/602 |
| 4,490,622 A | * | 12/1984 | Osborn | 290/52 |
| 4,506,578 A | * | 3/1985 | Gaines et al. | 83/583 |
| 4,583,447 A | * | 4/1986 | Hary | 92/7 |
| 4,703,625 A | * | 11/1987 | Caldwell | 60/602 |
| 4,860,640 A | * | 8/1989 | Ware | 92/63 |
| 5,199,260 A | * | 4/1993 | Iwick | 60/602 |
| 5,755,101 A | * | 5/1998 | Free et al. | 60/602 |
| 6,976,359 B2 | * | 12/2005 | Hastings et al. | 60/602 |
| 7,210,295 B2 | * | 5/2007 | McEwen | 60/602 |
| 2005/0012058 A1 | * | 1/2005 | Medina | 251/31 |
| 2005/0241309 A1 | * | 11/2005 | McEwen et al. | 60/600 |
| 2008/0022679 A1 | * | 1/2008 | Hara et al. | 60/602 |

* cited by examiner

Primary Examiner — Thomas Denion
Assistant Examiner — Cameron Setayesh
(74) Attorney, Agent, or Firm — Pearne & Gordon LLP

(57) ABSTRACT

A self-regulating wastegate valve actuator for dynamically regulating a wastegate valve in a turbocharged internal combustion engine. The wastegate valve actuator regulates and maintains a desired pressure differential across a throttle valve with minimal controlling elements by controlling a wastegate valve in response to the pressure differential generated across the throttle valve.

20 Claims, 4 Drawing Sheets

(a)

(b)

(c)

SELF REGULATING WASTE GATE

FIELD OF INVENTION

The present invention relates to turbocharger regulating systems and in particular to the regulation of turbocharger performance through the mechanical control of a wastegate.

BACKGROUND OF THE INVENTION

A turbocharger is a well known means of providing pressurized air to an internal combustion engine. A typical turbocharger features a turbine wheel driven by engine exhaust gases. The turbine drives a compressor that provides pressured air to the combustion engine's intake to increase engine performance. In general, as the speed of the combustion engine increases exhaust gas pressure increases. The turbocharger translates increased exhaust gas pressure into increased intake air pressure (boost pressure) and performance improves within practical limits. However, the uncontrolled pressurization of intake air can lead to problems with engine operation and can result in damage to the engine and turbocharger.

A typical turbocharged engine features a device known as a wastegate that allows exhaust gases to bypass the turbocharger when it is not desirable to increase intake air pressure. One such circumstance is when an increase in boost pressure would result in engine damage. When exhaust gases are diverted away from the exhaust turbine wheel, the turbocharger slows and boost pressure is reduced. A wastegate may divert variable amounts of the exhaust gases in response to a variety of control mechanisms known in the art.

Various devices have been disclosed in the prior art which operate a wastegate valve in response to many parameters. A common control parameter used to regulate the operation of a wastegate is the pressure difference that develops across a throttle valve placed between the turbocharger and an intake manifold of a combustion engine. Many of these systems are directed to particular applications requiring complex control systems such as aircraft engines operating in variable air pressure and temperature environments or high performance automobile engines which typically experience rapid changes in throttle application. Such systems often incorporate complex electronics and arrangements of mechanical elements and require specialized equipment and expertise to maintain.

Alternatively, simpler engines or engines designed to be operated primarily in slowly varying load conditions often use a simplified wastegate design which features a valve controlled by a diaphragm and held shut by a spring. The spring rests on the diaphragm in contact with a pressure space which is maintained at the pre-throttle boost pressure. When boost pressure applied to the diaphragm is sufficient to overcome the spring force, the valve is opened and exhaust gases bypass the turbocharger. This pressure set point may be reached while the throttle is closed or open with the wastegate actuator responding to both engine load conditions in the same manner. The adjustment of the chosen pressure set point is accomplished by adjusting the spring tension of the wastegate actuator. It is often not practical or even possible to adjust the spring tension of the wastegate actuator to account for varying conditions during the operation of the engine using these simplified designs.

Control of the wastegate using a diaphragm does not maintain a pressure differential across the throttle valve of the engine. Engines could benefit from maintaining a pressure differential across the throttle valve; however, the systems used to control the wastegate to maintain the pressure differential are typically too complex to make their use suitable in many engine applications.

SUMMARY OF THE INVENTION

In accordance with the present disclosure there is provided a wastegate valve actuator for controlling the position of a wastegate valve for a turbocharger of an internal combustion engine. The waste gate valve actuator compresses a first housing defining a first closed chamber sealed at one end with a first diaphragm, the first housing having a boost pressure inlet in fluid communication with the first closed chamber, the first diaphragm adapted to be coupled to the wastegate valve to control the position of the wastegate valve in reaction to movement of the first diaphragm. The wastegate valve actuator further comprises a second housing defining a second closed chamber sealed at one end with a second diaphragm, the second housing having an intake manifold pressure inlet in communication with the second closed chamber. The wastegate valve actuator further comprises an intake manifold pressure communicator located between the first and second housing, the intake manifold pressure communicator coupled to the second diaphragm and communicating a force to the first diaphragm in reaction to movement of the second diaphragm.

In accordance with the present disclosure there is also provided a turbocharger system for an internal combustion engine. The turbocharger system comprises a turbocharger driven by exhaust gases of the internal combustion engine, the turbocharger generating boost pressure provided to an intake manifold of the internal combustion engine through an intake pipe comprising a throttle valve located between the turbocharger and the intake manifold; and a wastegate valve moveable between an open position that diverts exhaust of the internal combustion engine away from the turbocharger and a closed position which directs exhaust of the internal combustion engine to the turbocharger. The turbocharger system further comprises a wastegate valve actuator for controlling the position of the wastegate valve, the waste gate valve actuator comprising a first housing defining a first closed chamber sealed at one end with a first diaphragm, the first housing having a boost pressure inlet coupled to the intake pipe between the turbocharger and the throttle valve, the boost pressure inlet in fluid communication with the first closed chamber, the first diaphragm adapted to be coupled to the wastegate valve to control the position of the wastegate valve in reaction to movement of the first diaphragm; a second housing defining a second closed chamber sealed at one end with a second diaphragm, the second housing having an intake manifold pressure inlet coupled to the intake pipe between the throttle valve and the intake manifold, the intake manifold pressure inlet in fluid communication with the second closed chamber; and an intake manifold pressure communicator located between the first and second housing, the intake manifold pressure communicator coupled to the second diaphragm and communicating a force to the first diaphragm in reaction to movement of the second diaphragm.

BRIEF DESCRIPTION OF THE DRAWING

These and other features of the invention will become more apparent from the following description in which reference is made to the appended drawing wherein:

FIG. 2(a) is a view of the piston housing from the boost pressure diaphragm side. FIG. 2(b) is a view of the piston housing from the intake manifold pressure diaphragm side. FIG. 2(c) is a side view of the piston housing.

DETAILED DESCRIPTION

In a typical turbocharged engine, it is often desirable to control the operation of a wastegate actuator in response to the pressure differential that develops across a throttle valve in the path of the engine's air intake. Changes in the pressure differential across the throttle valve may cause the engine to surge violently. An engine that surges violently causes erratic movement of its throttle valve which may lead to extreme stress on the turbocharger and contribute to turbocharger and engine failure. A typical wastegate may be adjusted to prevent this effect at a given engine load but changes in conditions such as engine load or temperature necessitate readjustment for optimal performance. By controlling the wastegate to maintain a pressure differential across the throttle valve, surging of the engine may be reduced.

Turbocharged engines may be used in various applications. Stationary natural gas burning internal combustion engines are an example of turbocharged engines that operate in slowly varying load and environmental conditions. Turbocharged engines that operate in these conditions are well suited to the wastegate control described herein; however, the wastegate control may be used advantageously in other turbocharged engine applications.

An illustrative application of an engine operating in slowly varying load and environmental conditions is in the compression of natural gas from well heads to reach typical pipeline distribution pressures. These natural gas compressing engines operate continuously and have typically required frequent manual adjustment of their wastegates due in part to local temperature variation. In many cases multiple compressor stages are used and where one compressor fails, the remaining compressors are subject to a sudden sharp increase in load. A sudden reduction in load, which may place the engine into a surging state, is also difficult to manage with conventional simplified wastegate designs.

Figure 1:
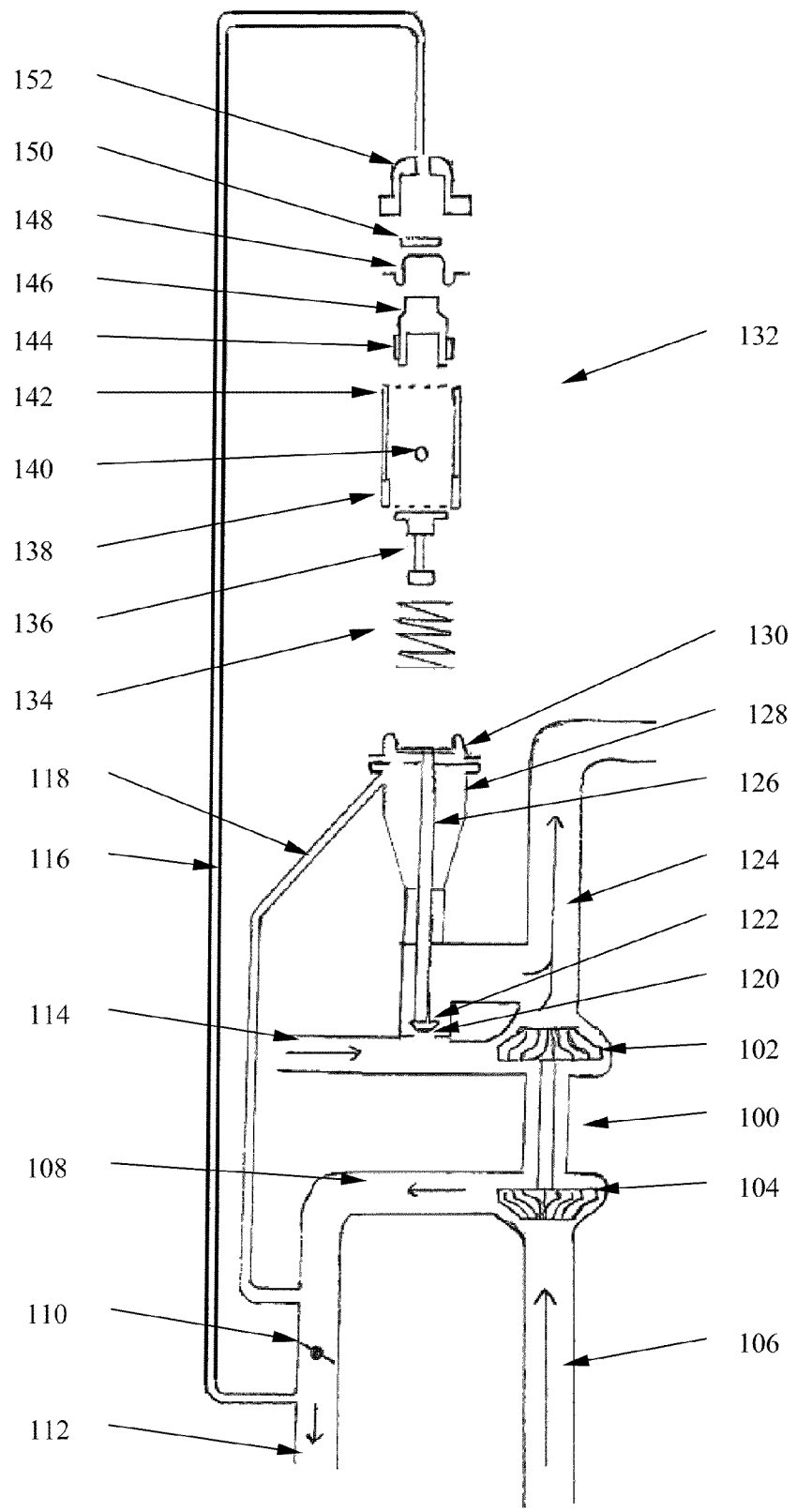
FIG. 1 shows a schematic diagram of an intake and an exhaust of a turbocharged internal combustion engine featuring a partially exploded profile of a wastegate control system in accordance with an embodiment of the present invention.

A schematically represented turbocharging system is shown in FIG. 1. A turbocharger 100 is used to compress air from an internal combustion engine air intake 106. When the intake turbine wheel 104 spins, compressed air is provided to the intake pipe 108. The air provided is pressurized to a boost pressure dependant on the rate at which the intake turbine wheel 104 is rotating. A throttle valve 110 is then used to adjust the air flow to the engine air intake manifold 112.

Intake turbine wheel 104 is rotatably driven by the exhaust turbine wheel 102 which is driven by engine exhaust gases in exhaust pipe 114. Generally, as more air is supplied to the engine intake manifold 112 via control of throttle valve 110, the internal combustion engine will produce increasing pressures of exhaust gases which in turn increases the boost pressure in the intake pipe 108. A wastegate valve 120 is provided to allow exhaust gases in the exhaust pipe 114 to bypass the exhaust turbine wheel 102 and allow the turbocharger 100 to slow when it is desirable to reduce the boost pressure in the intake pipe 108.

The wastegate valve is opened and closed using a wastegate valve head 122 that is mounted to a shaft 126 connected to the wastegate actuator 132 (shown partially exploded). More particularly, shaft 126 is mounted to the boost pressure reaction diaphragm 130 which seals a chamber within the wastegate housing 128. The chamber within the wastegate housing 128 is maintained at boost pressure by boost pressure sense line 118. An increase in boost pressure on the boost pressure reaction diaphragm 130 has the effect of increasing the net forces acting to open the wastegate valve in the overall system.

A spring 134 is seated against the boost pressure reaction diaphragm 130 and provides a reaction force that resists the opening of the wastegate valve. The spring is housed within a piston housing 142 attached to chamber 128. The piston housing 142 has an atmospheric pressure air bleed hole 140 which ensures that the pressure on the spring-side of the boost pressure reaction diaphragm 130 is maintained at atmospheric pressure.

At the far end of the piston housing 142 from the boost pressure reaction diaphragm 130 is the intake manifold pressure reaction diaphragm 148. The intake manifold pressure reaction diaphragm 148 seals a chamber formed by the intake manifold pressure housing 152 and is fixed to a piston housing 142. The intake manifold pressure reaction diaphragm 148 is secured in position with a diaphragm hold down plate 150. The chamber within the intake manifold pressure housing 152 is maintained at the pressure within the air intake manifold 112 by the intake manifold pressure sense line 116.

When pressure from the intake air manifold is applied to the intake manifold pressure reaction diaphragm 148, the diaphragm applies pressure to an intake reaction pressure piston 146 within the piston housing 142 which in turn applies pressure to an adjustable diaphragm contact post 136. The top portion of the adjustable diaphragm contact post 136 is shaped so as to engage the spring 134 and transfers force generated by the intake manifold pressure reaction diaphragm 148 to the spring 134. Therefore, an increase in pressure in the air intake manifold results in an increase in the net forces acting to close the wastegate valve 120. Further, the adjustable diaphragm contact post 136 may extend partially through the spring 134. The section of the contact post 136 that extends partially through the spring may come into contact with the boost pressure reaction diaphragm 130 to apply pressure to it.

The maximum pressure that may be exerted on the boost pressure reaction diaphragm 130 by the adjustable diaphragm contact post 136 is limited by the maximum travel of the intake manifold pressure reaction piston 146. The intake manifold pressure reaction piston 146 engages piston stop 138 to limit the maximum distance that the piston may travel. A rider band 144 stabilizes the intake manifold pressure reaction piston 146 within the piston housing 142.

The dimensions of the diaphragms are chosen to tune the response of the wastegate actuator. Generally, the intake manifold pressure reaction diaphragm 148 is selected to have a larger surface area than the boost pressure reaction diaphragm 130 because the intake manifold pressure will always be less than or equal to boost pressure. During engine operation, the boost pressure is invariably higher than the intake manifold pressure. The tension of spring 138 is dynamically regulated by the action of the intake manifold pressure reaction diaphragm 148 in response to the intake manifold pressure. The operation of the wastegate valve is therefore regulated by the pressure difference across the throttle valve 110. In the preferred embodiment of this invention as used in stationary natural gas burning internal combustion engines, the dimensions of the diaphragms, the spring tension, the position of the adjustable diaphragm post, and other mechanical variables that will be apparent to a person skilled in the art can all be adjusted to achieve the desired result. The preferred embodiment of the invention may be constructed to target and maintain a desirable pressure differential across the throttle valve of 7" Hg for example. A person skilled in the art will recognize that the invention is applicable to virtually any internal combustion engine using a throttle valve or plate and operating at a relatively constant atmospheric pressure such as a gasoline or propane burning engine.

Figure 2:
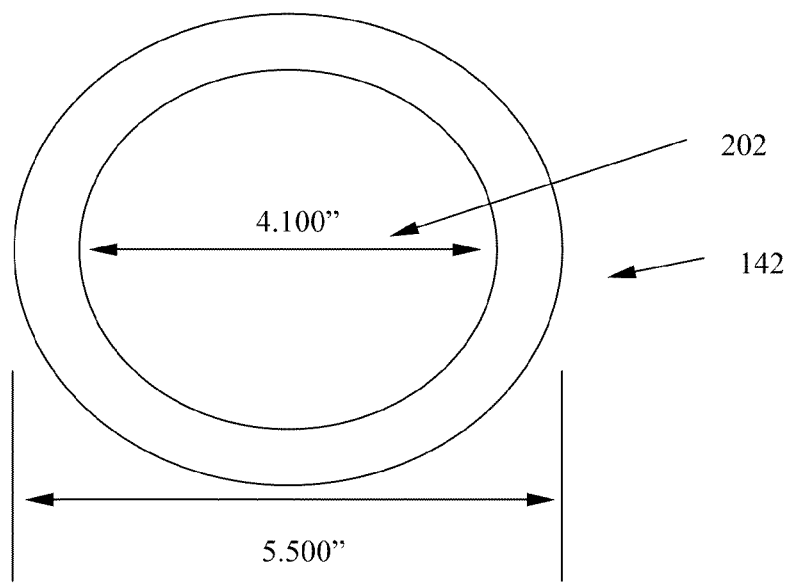
FIG. 2 shows multiple views of the piston housing component of the wastegate control system of the present invention.
Figure 2:
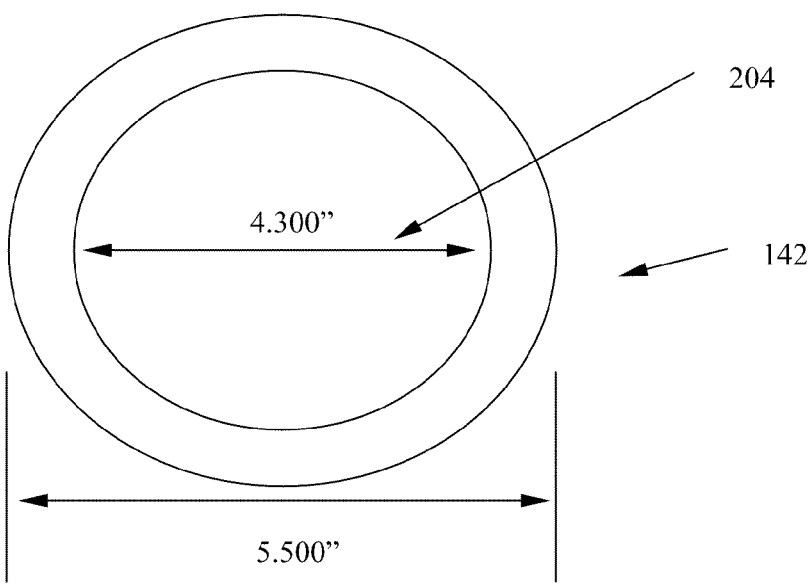
Figure 2:
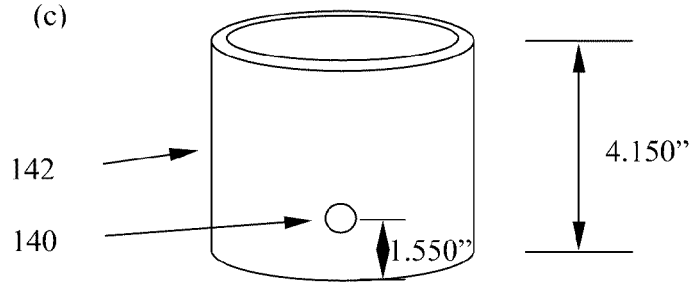

FIG. 2 shows various views of a piston housing 142 of one embodiment of the invention. FIG. 2(*a*) is a view of the piston housing 142 from the side fixed to the boost pressure diaphragm 130. The boost side inner dimension 202 shows the diameter of the piston housing 142 exposed to the boost pressure diaphragm of one embodiment of the present invention. The intake side inner dimension 204 shows the diameter of the piston housing 142 exposed to the intake manifold pressure diaphragm of one embodiment of the present invention. The selection of 4.300" for the intake manifold pressure diaphragm side and 4.100" for the boost pressure diaphragm side serves to target and maintain a desirable pressure differential across the throttle valve of 7" Hg for a natural gas burning engine in one embodiment of the invention.

Figure 3:
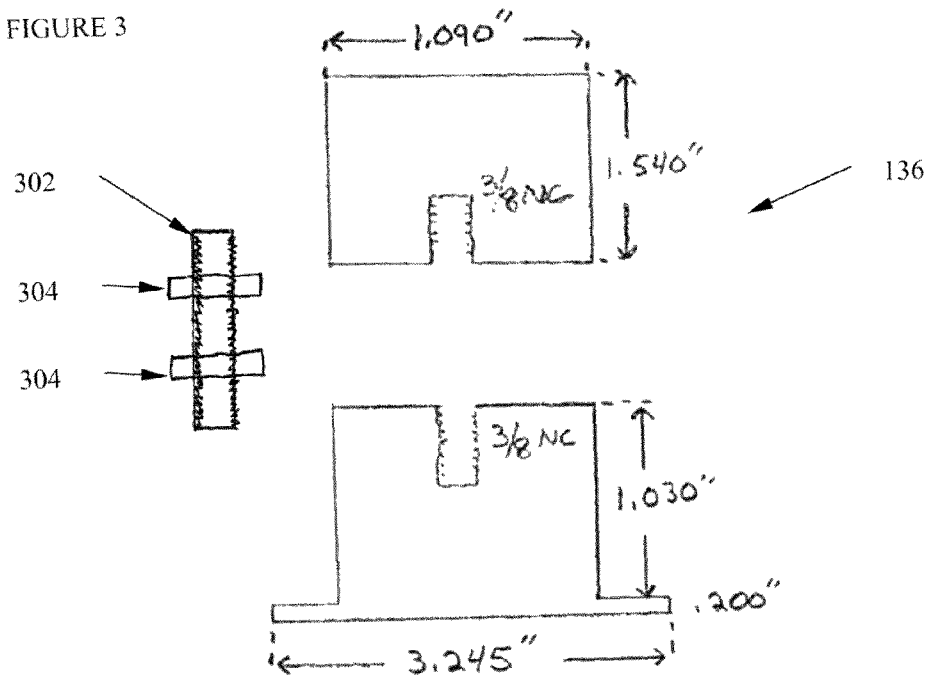
FIG. 3 shows a partially disassembled adjustable contact post with a threaded connector rod removed.

FIG. 3 shows a schematic cross section of an adjustable contact post 136 of one embodiment of the invention. A threaded connector rod 302 is shown removed from the body of the adjustable contact post 136. The length of the adjustable contact post 136 may be adjusted by threading the threading connector rod 302 to varying degrees into the upper and lower portions of the adjustable contact post 136. Nuts 304 are used to secure the threaded connector rod 302.

Figure 4:
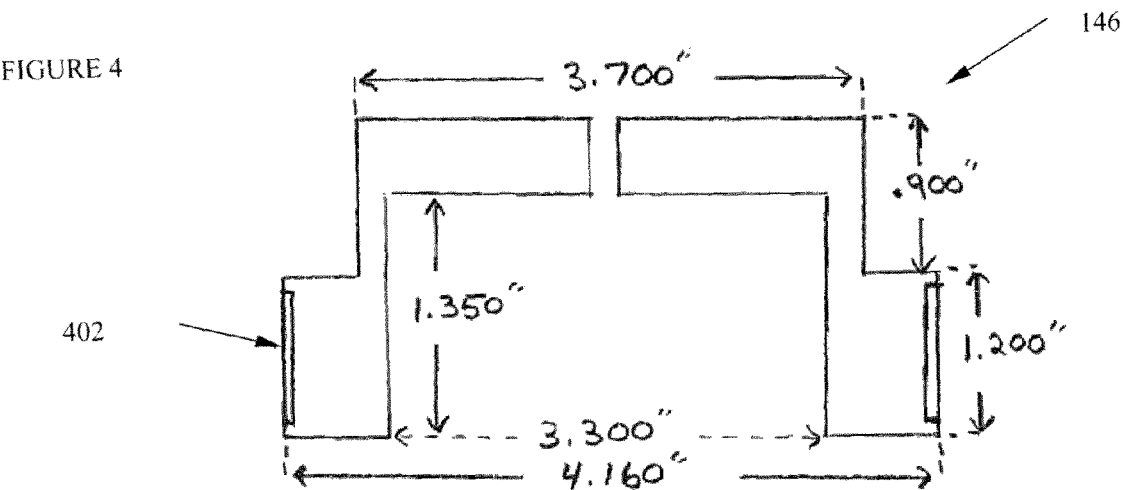
FIG. 4 shows a cross section of an intake manifold pressure reaction piston.
Figure 5:
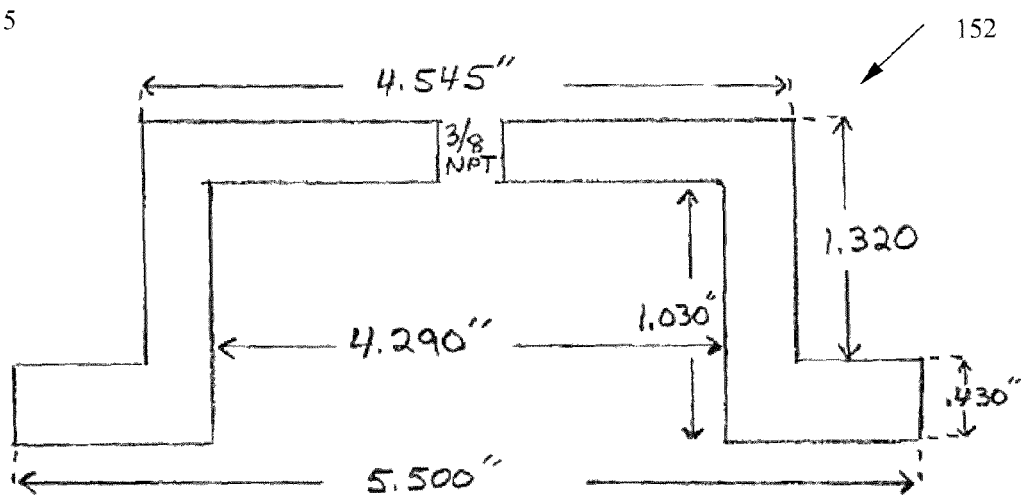
FIG. 5 shows a cross section of an intake manifold pressure housing.

FIG. 4 shows a schematic cross section of an intake reaction pressure piston 146 with intake reaction pressure piston rider band groove 402. FIG. 5 shows a schematic cross section of an intake manifold pressure housing 152 of one embodiment of the invention.

FIGS. 2, 3, 4 and 5 recite various measurements for different components. It is understood that the measurements are given as only one example of an illustrative embodiment of a wastegate valve actuator. It is understood that the dimensions of the components may be changed to adapt the wastegate valve actuator to different sizes of engines and/or turbochargers, as well as to different operating environments such as operating pressures and/or temperatures. The dimensions of the components may also be changed to adapt the wastegate valve actuator to maintain different pressure differentials across the throttle valve.

In a typical operating scenario an internal combustion engine is started in a low load condition with the throttle valve minimally open. Exhaust gases apply pressure to the exhaust turbine wheel 102 and to the boost pressure reaction diaphragm 130. As the turbocharger applies increasing boost pressure, minimal pressure is applied to the intake manifold reaction diaphragm 148 as the throttle valve restricts air flow to the intake manifold 112. As boost pressure builds, the wastegate valve opens, the turbocharger slows, and the pressure differential between intake pipe 108 and intake manifold 112 is reduced.

As the throttle valve is opened further and the engine load is increased to a mid-range load scenario, increasing pressure is applied to the intake manifold reaction diaphragm 148 relative to the boost pressure applied to the boost pressure reaction diaphragm 130. The intake pressure reaction diaphragm 148 moves the intake manifold reaction pressure reaction piston 146 and compresses the spring 134 until adjustable diaphragm contact post 136 contacts the boost pressure reaction diaphragm 130 resulting in a force that tends to further close the wastegate valve.

As the throttle valve is opened still further and the engine approaches a maximum load scenario, the intake pressure reaction diaphragm 148 moves the intake manifold reaction pressure reaction piston 146 further until this motion is restricted by the piston stop 138. The motion of the intake manifold reaction pressure reaction piston 146 is restricted by the piston stop 138 to prevent the situation where the wastegate valve would be forced closed to prevent an over-pressure situation and engine damage.

When the throttle valve is closed, the boost pressure rapidly increases in response to the action of the turbo charger while the intake ma pressure is reduced by the restriction of the throttle valve. In this case the system allows more exhaust gases to be diverted around the exhaust turbine wheel until the desired pressure differential is once again attained.

One or more currently preferred embodiments have been described by way of example. It will be apparent to persons skilled in the art that a number of variations and modifications can be made without departing from the scope of the invention as defined in the claims.

What is claimed is:

1. A wastegate valve actuator for controlling the position of a wastegate valve for a turbocharger of an internal combustion engine, the waste gate valve actuator comprising:

a first housing defining a first closed chamber sealed at one end with a first diaphragm, the first housing having a boost pressure inlet in fluid communication with the first closed chamber, the first diaphragm adapted to be coupled to the wastegate valve to control the position of the wastegate valve in reaction to movement of the first diaphragm;

a second housing defining a second closed chamber sealed at one end with a second diaphragm, the second housing having an intake manifold pressure inlet in communication with the second closed chamber; and an intake manifold pressure communicator located between the first and second housing, the intake manifold pressure communicator coupled to the second diaphragm and communicating a force to the first diaphragm in reaction to movement of the second diaphragm.

2. The wastegate valve actuator of claim 1, wherein:

the first housing comprises a wastegate housing;

the first diaphragm comprises a boost pressure reaction diaphragm;

the second housing comprises an intake manifold pressure housing; and the second diaphragm comprises an intake manifold reaction diaphragm.

3. The wastegate valve actuator of claim 2, further comprising:

a piston housing coupling the wastegate housing to the intake manifold pressure housing, the piston housing defining a piston chamber between the boost pressure reaction diaphragm and the intake manifold reaction diaphragm, the piston chamber in fluid communication with atmospheric pressure.

4. The wastegate valve actuator of claim 3, further comprising:

a spring located within the piston chamber, the spring biasing the boost pressure reaction diaphragm.

5. The wastegate valve actuator of claim 4, wherein the intake manifold pressure communicator comprises an intake manifold pressure reaction piston coupled between the intake manifold reaction diaphragm and a contact post shaped to engage the spring biasing the boost pressure reaction diaphragm.

6. The wastegate valve actuator of claim 5, wherein the contact post comprises a section extending partially through the spring and having an end shaped to contact the boost pressure reaction diaphragm.

7. The wastegate valve actuator of claim 6, wherein the contact post is adjustable to vary the distance between the point of engagement of the spring and the end of the contact post section shaped to contact the boost pressure reaction diaphragm.

8. The wastegate valve actuator of claim 1, wherein the first diaphragm is coupled to the wastegate valve by a shaft extending from the first diaphragm through the first housing to the wastegate valve.

9. A turbocharger system for an internal combustion engine, the turbocharger system comprising:
   a turbocharger driven by exhaust gases of the internal combustion engine, the turbocharger generating boost pressure provided to an intake manifold of the internal combustion engine through an intake pipe comprising a throttle valve located between the turbocharger and the intake manifold
   a wastegate valve moveable between an open position that diverts exhaust of the internal combustion engine away from the turbocharger and a closed position which directs exhaust of the internal combustion engine to the turbocharger; and
   a wastegate valve actuator for controlling the position of the wastegate valve, the waste gate valve actuator comprising:
      a first housing defining a first closed chamber sealed at one end with a first diaphragm, the first housing having a boost pressure inlet coupled to the intake pipe between the turbocharger and the throttle valve, the boost pressure inlet in fluid communication with the first closed chamber, the first diaphragm adapted to be coupled to the wastegate valve to control the position of the wastegate valve in reaction to movement of the first diaphragm;
      a second housing defining a second closed chamber sealed at one end with a second diaphragm, the second housing having an intake manifold pressure inlet coupled to the intake pipe between the throttle valve and the intake manifold, the intake manifold pressure inlet in fluid communication with the second closed chamber; and
      an intake manifold pressure communicator located between the first and second housing, the intake manifold pressure communicator coupled to the second diaphragm and communicating a force to the first diaphragm in reaction to movement of the second diaphragm.

10. The turbocharger system of claim 9, wherein the boost pressure inlet is coupled to the intake pipe through a boost pressure sense line.

11. The turbocharger system of claim 9, wherein the intake manifold pressure inlet is coupled to the intake pipe through an intake manifold pressure sense line.

12. The turbocharger system of claim 9, wherein:
   the first housing of the wastegate valve actuator comprises a wastegate housing;
   the first diaphragm of the wastegate valve actuator comprises a boost pressure reaction diaphragm;
   the second housing of the wastegate valve actuator comprises an intake manifold pressure housing; and
   the second diaphragm of the wastegate valve actuator comprises an intake manifold reaction diaphragm.

13. The turbocharger system of claim 10, wherein the wastegate valve actuator further comprises:
   a piston housing coupling the wastegate housing to the intake manifold pressure housing, the piston housing defining a piston chamber between the boost pressure reaction diaphragm and the intake manifold reaction diaphragm, the piston chamber in fluid communication with atmospheric pressure.

14. The turbocharger system of claim 11, wherein the wastegate valve actuator further comprises:
   a spring located within the piston chamber, the spring biasing the boost pressure reaction diaphragm.

15. The turbocharger system of claim 12, wherein the intake manifold pressure communicator comprises an intake manifold pressure reaction piston coupled between the intake manifold reaction diaphragm and a contact post shaped to engage the spring biasing the boost pressure reaction diaphragm.

16. The turbocharger system of claim 13, wherein the contact post comprises a section extending partially through the spring and having an end shaped to contact the boost pressure reaction diaphragm.

17. The turbocharger system of claim 14, wherein the contact post is adjustable to vary the distance between the point of engagement of the spring and the end of the contact post section shaped to contact the boost pressure reaction diaphragm.

18. The turbocharger system of claim 9, wherein the first diaphragm is coupled to the wastegate valve by a shaft extending from the first diaphragm through the first housing to the wastegate valve.

19. The turbocharger system of claim 9, wherein the wastegate valve is internal to the turbocharger.

20. The turbocharger system of claim 9, wherein the wastegate valve is external to the turbocharger.

* * * * *